United States Patent [19]

Eigner et al.

[11] Patent Number: 4,675,586
[45] Date of Patent: Jun. 23, 1987

[54] MONITORING CIRCUIT FOR A DOOR OPERATING D.C. ELECTRIC MOTOR

[75] Inventors: Otto Eigner; Richard E. Jones, both of Sydney, Australia

[73] Assignee: Byrne & Davidson Industries Limited, New South Wales, Australia

[21] Appl. No.: 760,364

[22] PCT Filed: Oct. 11, 1984

[86] PCT No.: PCT/AU84/00198
§ 371 Date: Jun. 5, 1985
§ 102(e) Date: Jun. 5, 1985

[87] PCT Pub. No.: WO85/01773
PCT Pub. Date: Apr. 25, 1985

[30] Foreign Application Priority Data

Oct. 12, 1983 [AU] Australia ............................. PG1807

[51] Int. Cl.$^4$ ............................................. H02P 3/08
[52] U.S. Cl. .................................... 318/458; 318/456; 318/286; 318/331; 318/468
[58] Field of Search ............... 318/280, 286, 331, 430, 318/434, 467, 466, 468, 469, 456, 458, 461, 248, 343, 345 CA, 345 AB, 355, 368, 377, 411, 427

[56] References Cited

U.S. PATENT DOCUMENTS

| 3,231,808 | 1/1966 | McDaniel | 318/331 |
| 3,568,027 | 3/1971 | Bacon | 318/331 |
| 3,599,064 | 8/1971 | Friedman | 318/331 |
| 3,671,835 | 6/1972 | McMenamy et al. | 318/331 X |
| 4,078,194 | 3/1978 | Johnson, Jr. | 318/331 |
| 4,274,037 | 6/1981 | Soeda | 318/331 |
| 4,303,874 | 12/1981 | Iwai | 318/331 |
| 4,510,423 | 4/1985 | Iwasawa | 318/331 |
| 4,558,259 | 12/1985 | Craig | 318/468 X |
| 4,585,981 | 4/1986 | Zintler | 318/266 X |

Primary Examiner—William M. Shoop, Jr.
Assistant Examiner—Bentsu Ro
Attorney, Agent, or Firm—Pennie & Edmonds

[57] ABSTRACT

A monitoring circuit for a door operating D.C. electric motor, the circuit comprises a first means for detecting a back EMF of the motor and producing a load signal indicative of the magnitude of the back EMF, a second means for detecting the time rate of change of the load signal and issuing an obstruction signal if the magnitude of the time rate of change of the load signal exceeds a predetermined value.

15 Claims, 1 Drawing Figure

MONITORING CIRCUIT FOR A DOOR OPERATING D.C. ELECTRIC MOTOR

TECHNICAL FIELD

This invention relates to apparatus for detecting obstruction of a motor driven door.

The invention was developed for detecting obstruction of a motor driven garage door during opening and closing operation and will herein be described with reference to that use but it will be understood that the invention is equally applicable to use for detecting obstructing of other types of electric motor operated doors.

BACKGROUND OF THE INVENTION

Motor driven garage doors of the upward opening and downward closing type have been provided with obstruction detection switches operated by means of a trip bar at the lower leading edge of the door. The switch is arranged so as to stop or reverse the door if the trip bar strikes an obstruction during descent. While such means are effective they add to the complexity of the door manufacture and installation and therefore to cost.

It has been practiced to sense the absolute load of the driven system either by reaction of the drive, for example as described in Australian patent specification No. 521,735, or by change in current flow in the motor circuit. Such systems suffer from nuisance trips due to changes in ambient and local conditions or are maladjusted or desensitized so that nuisance trips do not occur but then the system tends to become a safety hazard. When the door is a rolling door then the motor load changes progressively and non-linearly between open and closed positions as a result of friction and making adjustment of trip level even more difficult. Thus, to date, for rolling doors the only satisfactory method for reversing the door when an obstruction is encountered during descent has been the trip bar previously described.

DISCLOSURE OF THE INVENTION

According to one aspect the invention consists in a monitoring circuit for a door operating D.C. electric motor, said circuit comprising first means for detecting the back EMF of the motor and producing a load signal indicative of the magnitude thereof; and second means for detecting the time rate of change of the load signal and issuing an obstruction signal if the time rate of change of the load signal exceeds a predetermined value.

For preference, the apparatus monitors the back EMF continuously and is sensitive to changes occurring during any interval of predetermined short duration.

According to a second aspect the invention consists in a monitoring circuit according to the first aspect further comprising third means for comparing said load signal with a reference signal to issue an obstruction signal if said load signal changes by a predetermined magnitude.

As is well known the speed of a DC motor reduces with increasing load and the back Electro Motive Force (EMF) developed by the motor is proportional to motor speed. Thus if the load is increased the motor speed decreases causing the back EMF to decrease. The present invention provides apparatus which produces a signal responsive to the rate of change of back EMF of the motor. This may be achieved by sampling the back EMF during one time interval and comparing it with a stored EMF detected during a previous time interval the time intervals being at predetermined spacing. In a preferred embodiment a differentiating circuit is used to generate a signal the voltage of which is proportional to the change or back EMF of the motor during a predetermined period, that is to say, the rate of change of back EMF. If the differentiated signal voltage exceeds a predetermined voltage then the circuit trips and an obstruction signal is issued which may be used to stop or reverse the motor.

By way of example only in embodiment of the invention will now be descrioed with reference the drawings.

BEST MODE OF CARRYING OUT THE INVENTION

Figure 1:
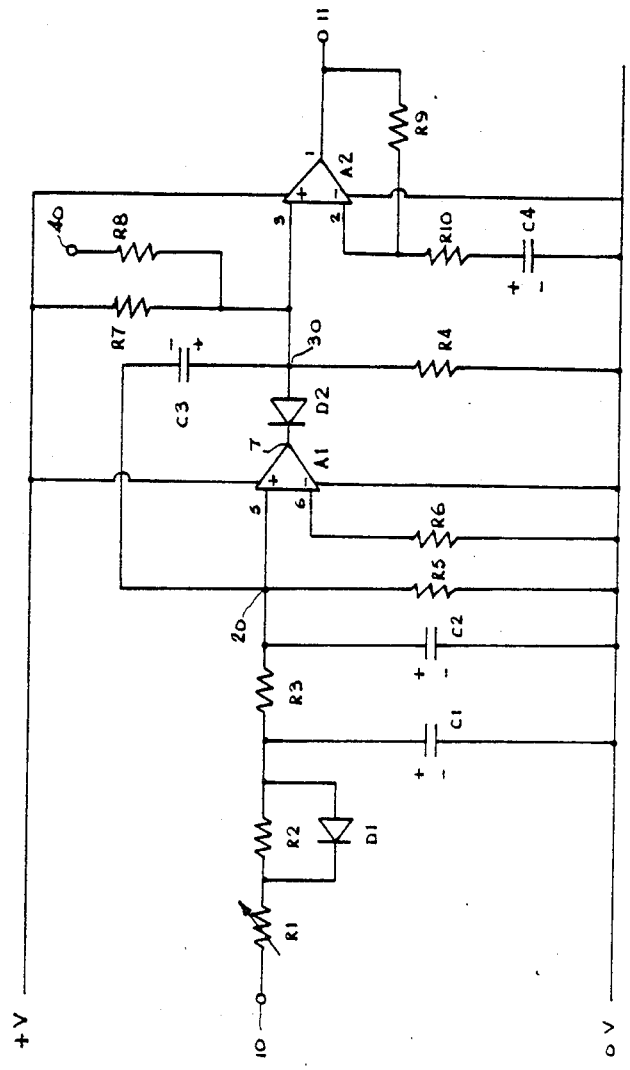
FIG. 1 is schematic circuit diagram of a monitoring circuit according to the present invention.

In the embodiment described a steel roller garage door is driven between open and closed positions by a low impedance 24 voltage DC motor energised from a 240 volt: 24 volt step down transformer via a full wave bridge rectified unfiltered power supply. The motor is connected to the power supply via a relay so connected as to enable the polarity of supply to the motor to be reversed. By means of the relay the direction of run of the motor and thus the direction in which the door is driven may be reversed.

With reference to the schematic circuit shown in FIG. 1, lead 10 is connected to the positive side of the motor when the door is travelling downwards. Resistors R1 and R2 provide a high forward impedance while diode D1 provides a low reverse impedance.

Since the motor supply voltage is unfiltered it will vary between the peak D.C. supply voltage and zero at twice the frequency of the voltage supplied to the step down transformer. When connected to the positive terminal of the D.C. motor the supply voltage therefore varies between the peak DC value and a non-zero positive voltage due to the back EMF of the motor. The magnitude of the non-zero positive voltage provides a measure of back EMF of the motor. Resistors R1 and R2 block charging of capacitor C1 by the supply voltage appearing at lead 10 whilst the low reverse impedance provided by diode D1 allows capacitor C1 to be discharged to the lower no zero positive voltage reached by the motor supply. Thus the variations or ripple of the voltage appearing at the positive terminal of the DC motor which is connected to lead 10 result in capacitor C1 being charged to a voltage which varies according to the back EMF of the motor. Resistor R3 and capacitor C2 act as a filter to smooth voltage spikes and noise so that the voltage at circuit junction 20 substantially varies only according to the back E.M.F. of the motor.

In the presently described embodiment a door obstruction signal is issued in two circumstances. An obstruction signal is issued if the rate of change of back EMF falls at a rate of change which exceeds a predetermined rate ("dynamic load"). An obstruction signal is also issued if the back EMF falls below a predetermined voltage ("static overload").

The static overload part of the circuit will be described first. A1 is an operational amplifier functioning as a comparator to compare the voltage at terminal 5 (varying according to motor speed) with a reference voltage at terminal 6 derived via resistor R6. In the present embodiment the adjustment of sensitivity is obtained by varying the input impedance via resistor R1 rather than by adjustment of the reference voltage as this provides additional smoothing. If for any reason the motor slows to such a Point that the voltage at 5 goes low relative to the voltage at 6 then the output 7 goes low. When the output at 7 goes low, input 3 to operational amplifier A2 goes low relative to input 2. Operational amplifier A2 is arranged as a non-inverting A.C. amplifier by connection of resistors R9 and R10 and capacitor C4. Operational amplifier A2 has no D.C. gain and the D.C. Voltage level of output 1 follows the D.C. voltage level of input 3. Thus when input 3 goes low relative to input 2, the output terminal 1 goes low which trips a switching means (not shown) connected at 11. The switching means comprises a Schmitt trigger (not shown) and a reversing relay (not snown) activated by the Schmitt trigger to cause the door motor to reverse or if preferred may be arranged to cause the door to stop. By this means the downwardly moving door is reversed if the door speed falls below a predetermined absolute speed or is otherwise overloaded.

The "dynamic overload" part of the circuit will now be described. Capacitor C3 and resistors R7 and R4 form a high pass filter or differentiating circuit. The differentiating circuit is isolated from operational amplifier A1 by diode D2. The voltage signal at circuit junction 30 therefore varies according to the time rate of change of the voltage signal at junction 20. If the voltage at 20 decreases (as a result of decreasing D.C motor speed), the voltage at 30 is decreased by an amount proportional to the time rate of change of voltage at 20. The constant of proportionality or differentiation constant is determined by the component values of the elements forming the differentiating circuit.

Therefore, if the voltage at junction 20 falls at a rate greater than a predetermined rate dependent on the values of C3, R7, and R4, the input 3 of operational amplifier A2 will go low relative to input 2 causing output 1 of A2 to go low. As described above operational amplified A2 is arranged as a non-inverting AC amplifier by connection of resistors R9 and R10 and capacitor C4. R9, R10 and C set the A.C. gain and frequency response of operation amplifier A2. These components can also be selected to adjust the time rate of change of input voltage sensitivity of the amplifier A2. In this way the sensitivity to the rate of deceleration can further be insured. Output 1 going low trips a Schmitt trigger which causes the door to reverse as described above. The descending door is thus caused to stop or reverse if there is a change in motor velocity which exceeds a predetermined time rate of change.

The sensitivity to rate of deceleration may be adjusted by alteration to the resistance of R7. This has two main effects. Firstly, a change in resistance R7 alters the differentiation constant thus varying the magnitude of the voltage applied at 30 by the rate of charge of voltage at 20. In addition, change in resistance R7 alters the D.C. level of terminal 3 since R7 and R4 form a potential divider between circuit supply +V and ground. As the D.C. level of terminal 3 is varied the magnitude of the differentiated signal required to force terminal 3 low relative to terminal 2 is altered. In particular, the level of sensitivity may be decreased by switching resistor R8 into parallel with R7. In the present example an accompanying door controller logic circuit (not shown) is arranged to bypass the circuit of FIG. 1 during the first second when the motor is switched on in the downward direction, that is to say, while the voltage and back EMF are affected by the starting load. After one second the voltage and back EMF have usually stabilized and the circuit of FIG. 1 is switched in but with resistor R8 remaining open circuit. After 3.75 seconds resistor R8 is switched from open circuit to logic high in parallel with resistor R7 by connecting terminal 40 to circuit supply +V. The sensitivity is thereby reduced, that is to say increasing the change in speed required to reduce the output of operational amplifier A2 to produce an obstruction signal at 1. When a "door down" command signal is received by the logic circuit the motor commences operation in a downward direction and after an initial one second override the door operates with a high level of sensitivity. Thus in the region near the fully open position in which rolling type steel doors have a tendency to balloon or unwind internally when the door meets an obstruction, the obstruction signal is readily tripped. The high sensitivity also provides very low reversing forces should the door strike somebody around the head. However after 3.75 seconds when the door is advanced towards fully closed, the sensitivity is reduced so that a steady increase in load for example due to door friction will have no influence. However a sudden increase in load due to an obstruction will trip the dynamic load detector.

Alternatively, the door controller logic circuit can be arranged to switch in the circuit of FIG. 1 after one second and then progressively decrease the sensitivity required to produce an obstruction signal as the door decends. This can be achieved by replacing R7 with a widely variable resistance or by sequentially switching several resistors into parallel with R7.

Typically, the components used in the circuit of FIG. 1 are as follows:

| R1 - 470Ω | +V = 8 volts |
| --- | --- |
| R2 - 100kΩ | C1 4.7 μF |
| R3 - 100kΩ | C2 1 μF |
| R4 - 1MΩ | C3 1 μF |
| R5 - 100kΩ | C4 1 μF |
| R6 - 47kΩ | D1 - IN4004 |
| R7 - 1MΩ | D2 - IN914 |
| R8 - 1MΩ | A1 - LM358 |
| R9 - 470kΩ | A2 - LM358 |
| R10 - 1MΩ | |

It has been found that preferred embodiments of the invention are particularly sensitive and cause a rolling shutter door to reverse with a very slight but rapid increase in load and yet the system can be applied to maladjusted doors and to doors of varying size without requiring additional adjustment. The static load sensing device detects a stall or near stall condition of the motor.

The presently described garage door control systems is provided with a remote operating button which is connected to the logic circuit of the controller by means of two wires. The remote button is energized at one of three levels of current flow by the control logic circuit. When the door is in the fully closed position the current level is at its lowest. When the door is not in the closed position tne level is at a higher value and when the button is depressed and closes the contact a third and higher level of current flow is achieved. The button device has a light emitting diode which is switched on when the middle level of current is flowing. It will not switch on at the lower level of current when the door is in the closed position and is switched off when the button is depressed and closes the contact. This device thus provides two wire remote indication of a condition in which the garage door has been left in a "not closed" condition and operates without regard to polarity or the two wire connection.

As will be apparent to those skilled in the art the inventive concept hereof can be carried into effect by other analog and digital circuit means without departing from the teaching hereof and such other means are deemed within the scope of this disclosure.

We claim:

1. A monitoring circuit for a door operating D.C. electric motor, said circuit comprising first means for detecting the back EMF of the motor and producing a load signal indicative of the magnitude thereof; and second means for detecting the time rate of change of the load signal and issuing an obstruction signal if the magnitude of the time rate or change of the load signal exceeds a predetermined value.

2. A monitoring circuit as claimed in claim 1 further comprising third means for comparing said load signal with a reference signal to issue a second obstruction signal if said load signal changes by a predetermined magnitude.

3. A monitoring circuit as claimed in claim 1 or 2 wherein the back EMF is monitored to produce a continuous load signal.

4. A monitoring circuit as claimed in claim 1 or claim 2 wherein said first means is connected to a terminal of the DC motor to produce the load signal.

5. A monitoring circuit as claimed in claim 4 wherein the motor is energized by a full wave rectified unfiltered supply.

6. A monitoring circuit as claimed in claim 5 wherein said first means has a high forward impedance and a substantially lesser reverse impedance.

7. A monitoring circuit as claimed in claim 6 wherein the forward and reverse impedances are adjustable to vary the magnitude of said load signal.

8. A monitoring circuit as claimed in claim 1 or claim 2 wherein said second means includes a differentiating circuit to detect the magnitude of the time rate of change of the load signal.

9. A monitoring circuit as claimed in claim 8 wherein impedance of the differentiating circuit is adjustable to vary the magnitude of the time rate of change of the load signal.

10. A monitoring circuit as claimed in claim 9 wherein said second means compares a voltage signal generated by the differentiating circuit and indicative of the magnitude of the time rate of change of said load signal with a reference voltage signal to produce said obstruction signal.

11. A monitoring circuit as claimed in claim 10 wherein the voltage signal generated by said differentiating circuit is superimposed on a D.C. voltage level before comparison with the reference voltage signal, said D.C. voltage level being adjustable to determine the magnitude of the time rate of change of said load signal required to produce said obstruction signal.

12. A monitoring circuit as claimed in claim 1 or claim 2 further comprising switching means adapted to reverse the motor on receipt of at least one of said obstruction signal and said second obstruction signal.

13. A monitoring circuit as claimed in claim 1 or claim 2 further comprising a door controller logic circuit adapted to prevent issue of any obstruction signal whilst said motor is under starting load after having been energized.

14. A monitoring circuit as claimed in claim 13 wherein said door controller logic circuit is adapted to reduce the sensitivity of said monitoring circuit after the elapse of a predetermined time interval from said motor being energized in a door closing direction.

15. A monitoring circuit as claimed in claim 1 or claim 2 wherein said door is a garage door of the upward opening and downward closing type.

* * * * *